Nov. 23, 1943.   R. N. SHIRAS   2,335,162
PROCESS FOR THE SEPARATION OF HYDROCARBON GASES
Filed June 2, 1941
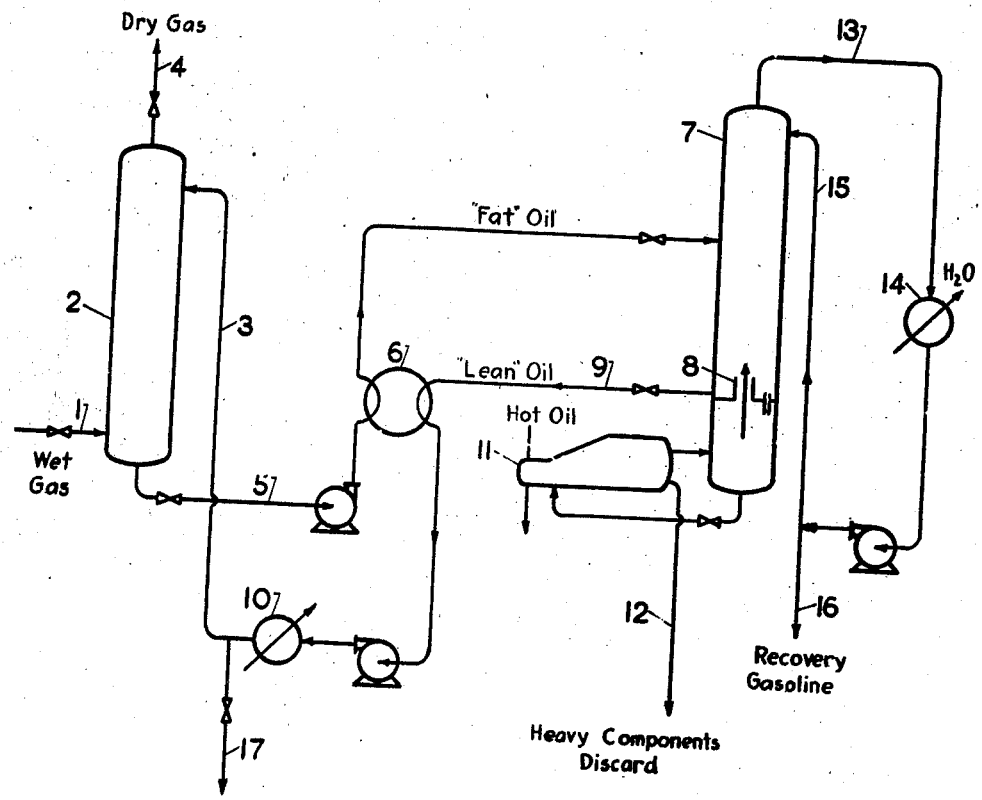
Inventor: Russell N. Shiras
By his Attorney:

Patented Nov. 23, 1943

2,335,162

UNITED STATES PATENT OFFICE 2,335,162

PROCESS FOR THE SEPARATION OF HYDROCARBON GASES

Russell N. Shiras, Oakland, Calif., assignor to Shell Development Company, San Francisco, Calif., a corporation of Delaware Application June 2, 1941, Serial No. 396,324

5 Claims. (Cl. 196—8)

This invention relates to a method and apparatus for an absorption separation of hydrocarbon gases and more particularly pertains to an absorption process for the separation of desired constituents from wet gases such as refinery gas, coke oven gases, well effluents, etc., in which an absorption medium of optimum molecular weight may be continuously and economically supplied to the absorber.

In the operation of a conventional absorption plant for the separation of desired components from hydrocarbon gases, the wet gases are brought in contact with an absorption medium usually termed a "lean oil." After such contact the oil containing the absorbed constituents (fat oil) is fed into a distillation column, usually termed a "stripper," wherein at least a portion of the absorbed material is separated by distillation and the residue returned to the absorber as "lean oil."

In the operation of such a plant the selection of an absorption oil is an important consideration in operating efficiency. It is desirable to have an absorption oil of greater-than-the-molecular weight of, but approaching that of, the constituents it is desired to absorb from the wet gas or gaseous feed. Although a mol of heavy oil will absorb as much of a lighter constituent as a mol of light oil, a given quantity of light oil will contain more mols than an equal volume of higher molecular weight or heavier oil. Thus, by selecting an absorption oil of low molecular weight, fewer gallons need be circulated as compared to the heavy oils to obtain a given extraction efficiency. However, care must be taken not to select too volatile or light a material for the absorbing medium, otherwise large amounts of this oil may be carried out of the absorber with the uncondensed or residue gas.

The selection of an absorption oil of optimum molecular weight for the constituents it is desired to absorb is only a start toward operating with the most efficient absorption medium in the system. Contaminants in the form of materials of higher molecular weight than that of the selected absorbent are constantly introduced into the absorption medium from the wet gas or gaseous feed. For example, in absorbing certain constituents from well effluents, such as natural gas or the fluid from so-called distillate wells, entrained material of higher molecular weight than that desired for the absorption medium is constantly being introduced into the absorbent. Such materials being of higher molecular weight than the optimum selected for the absorbing medium appreciably lessen its efficiency. Due to the higher molecular weight of such contaminants, they are not removed from the absorption medium in the conventional stripping operation.

In keeping with the foregoing, it will be assumed in the specification and appended claims that the wet gas or gaseous feed referred to contains liquefiable components of lower and higher boiling points than those constituting the lean absorption medium.

It is known to introduce high pressure gaseous feeds from distillate wells into a separator prior to the absorber to remove a portion of the components from the feed which are of higher molecular weight than the absorption oil by reducing the pressure several hundred pounds to achieve separation of the undesirable components by retrograde condensation. Such a procedure, in addition to being relatively inefficient in removing high molecular weight contaminants, entails an expensive compression operation if disposal of the residue gas from the absorber demands that it be at a high pressure, for example, if the residue gas is to be used for gas lift or repressuring operations.

It is also known to remove high boiling impurities from the absorption medium by subjecting a portion or all of said medium to a reclamation treatment. Such an operation comprises distilling all or a portion of the absorption medium in a separate distillation unit. This treatment involves added expense for additional equipment, the heating medium and cooling means for the vaporized absorbent.

It has been further proposed to remove small portions of the lean absorption medium from the bottom of the stripping column and to remove impurities from the portion so withdrawn by contacting with steam. The steam so employed is then used in the stripping column. This method meets with the objection that the major portion of high molecular weight contaminants cannot be removed from the lean oil since only a small portion of the absorbent can be so purified and little or no improvement is obtained in keeping the molecular weight of the absorption oil at its optimum. That is, the amount of high molecular weight contaminants removed from the absorption medium will be to the amount of high molecular weight contaminants retained in the absorption medium in the same ratio as the amount of lean absorption medium feed to the distillation cleanup still is to the amount not so fed.

It is therefore a primary object of this invention to provide a convenient and economical method for continuously maintaining absorption mediums at an optimum preselected molecular weight. A further object is to provide an improved absorption process of improved utility for yielding a high-pressure residue gas. Another object is to permit the continuous use of absorption mediums of lower molecular weight than the highest molecular weight constituents in the feed stream. A special object is to prevent the continuous accumulation in the absorption oil recycle of components of higher molecular weight than that of the absorption oil and, instead, to maintain the concentration of such components in the recycled absorption medium stream at a low value, preferably less than 5%. Another object is to make dual use of reflux heat in the "fat oil" rectifier or stripper in an absorption system.

In accordance with my invention, I have found that one or more of the foregoing objects can be accomplished by my improved apparatus and process for an absorption system, which contemplates separating desired absorbed constituents and a major portion of high molecular weight contaminants from a fat absorption medium containing the same, by the method comprising vaporizing and separating the desired absorbed constituents from the fat absorption medium in a primary fractionating zone in which vapors from a secondary fractionating zone are utilized as the heating means to form a bottom product containing the lean absorption medium and high molecular weight contaminants, withdrawing a major portion of the bottoms from the primary fractionating zone, heating the withdrawn portion in a secondary fractionating zone equipped with heating means to vaporize and separate the absorption medium from high molecular contaminants, returning the vapors so produced to the primary distillation zone and withdrawing and returning a minor portion of the bottoms from the primary distillation zone to the absorption system as lean absorption medium.

In order to achieve high removal of high molecular weight contaminants, it is essential that at least a major portion of the bottoms from the primary fractionating zone be conducted into the secondary fractionating zone, and it is preferable that the ratio of the bottoms so conducted to bottoms recycled as lean absorption medium be at least 2:1.

More in detail, the invention contemplates absorbing desired constituents from hydrocarbon gases by contacting them with an absorption medium of suitable or optimum molecular weight. The resulting fat absorption oil containing the desired absorbed constituents and high molecular weight contaminants is subjected to rectification in a column consisting of two sections—an upper section corresponding to a conventional stripping column and a lower fractionation section containing a reboiler for concentrating the contaminants and furnishing reflux vapor for the upper stripper section. Means are provided for separating the two sections of the column which allow vapors to go upward and a major portion of the reflux to go downward. The remaining minor portion of reflux is withdrawn and returned to the absorber as the absorption medium. Heat is supplied to the column by means of the reboiler in sufficient quantity to vaporize the absorption medium with the exception of the high molecular weight contaminants, which are withdrawn as a liquid from the redistillation section of the column. The ascending vaporized absorption medium then rectifies the entering fat absorption oil.

From the following example it will be apparent that the instant invention offers a marked advance in maintaining absorption medium at optimum molecular weight, i. e., free from an accumulation of high molecular weight contaminants over the conventional bleed to a separate distillation unit, and yet requires substantially no more heat in addition to the heat required for stripping the desired absorbed constituents from the absorption medium.

POSTULATES (a) The wet gas contains 3 mols of material higher-boiling than the absorption oil per 100 mols of wet gas.

(b) The circulation rate of absorption oil is 3 mols per mol of wet gas.

(c) The ratio of vapor from the reboiler of the lean oil stripping column to the bottom product lean oil is 1.5 to 1. This is needed to effect the desired separation of the lean oil from the light distillate.

*Case I—Continuous bleed to a separate lean oil cleanup column—conventional process*

10% of the bottom product from the lean oil stripper is bled to a cleanup column where 75% of the contaminating heavy material contained in this slip stream is removed as a bottom product along with a 10% concentration of absorption oil components. The top product, lean oil denuded of heavy contaminants, joins the remainder of the stripper bottoms and the combined stream constitutes the absorption oil for the absorption column.

The concentration of heavy contaminants in the absorption oil will build up until the amount of the contaminants leaving in the bottom product of the cleanup column is equal to the amount entering the system in the wet gas. Therefore, for each 100 mols of wet gas containing 3 mols of heavy contaminants, there must be 3.33 mols of bottom product from the cleanup column comprising 3 mols of heavy contaminants and .33 (or 10%) mol of absorption oil. According to the postulates of the case, the 3 mols are 75% of the heavy contaminants in the feed to the cleanup column. The feed therefore must contain 4 mols of heavy contaminants, 3 mols of which are removed and 1 mol of which remains in the purified absorption oil. It follows, then, that before a slip stream of 10% of the bottom product from the stripper will contain 4 mols of impurities to balance the input of 3 mols of impurities, the lean absorption oil stream must contain approximately 40 mols of impurities. More precisely, from the stipulated conditions that the lean oil circulation to the absorber is 300 mols for each 100 mols of such gas and that feed to the cleanup column is 10% of the bottom product of the stripper column, material balance calculations show that for a balanced state the feed to the cleanup column must be 30.333 mols. The above may be summarized in the following equation:

$$30.333 \text{ mols} \times \frac{90\%}{10\%} + 30.333 \text{ mols} - 3.33 \text{ mols} = 300 \text{ mols}$$

The concentration of heavy contaminants in this cleanup column feed, and hence also in the 90% bypassed lean oil, is 4/30.333 or 13.2%, and the concentration in the final lean oil stream is $(272.997 \times 13.2 + 1) \div 300$ or 12.3%.

*Case II—Heavy contaminant concentrating section within the stripper column—invented process*

According to my invention the heavy contaminants leave the system as the bottom product of the concentrating section, while the vapors entering the stripper proper from this section take the place of the vapors from the reboiler of the conventional stripper. The overflow from the stripper proper is by material balance equal in quantity and composition to the sum of the bottom product and these vapors. Under the stipulated conditions the bottom product is 3 mols of heavy contaminants together with 10% or 0.33 mol of absorption oil components for each 100 mols of wet gas. In view of the postulate of the case that the ratio of vapor from the secondary column to the recycled bottoms from the primary column is 1.5 to 1, the corresponding figure for the vapor entering the stripper section is 300 mols×1.5, or 450 mols. On the basis of the same 75% recovery of the heavy contaminants postulated for the cleanup column in the preceding case, the liquid overflow must contain 3÷.75, or 4 mols of heavy contaminants, while its total quantity is 450+3.33 or 453.33 mols per 100 mols wet gas. This gives 4÷453.33 or 0.88% concentration of heavy contaminant which is also the heavy contaminant concentration for the lean oil returned to the absorption column as against the 12% found for the conventional process.

In Case I, in which approximately 30 mols are fed to the cleanup column the vaporization load would be about 27 mols (27 mols of overhead product and 3 mols of bottoms), which is in addition to the 450 mols of reflux which must be vaporized in the stripper column. In comparison thereto in the new process, as illustrated by Case II, the contaminants are removed during the stripping operation so the vaporization load is only the 450 mols required for reflux.

If the same degree of purity of recycled lean oil were to be obtained in Case I as in Case II, the slip stream or feed to the cleanup column would have to be 70% rather than 10% of the lean absorption oil, in which event the vaporization load would be at least 675 mols as compared to 450 mols in Case II, or a 50% increase over the invented method.

A preferred form of the process and apparatus of my invention is illustrated by the attached drawing. Wet gas from a source not shown is introduced through line 1 into absorber 2. The absorber may comprise a shell containing any suitable means for obtaining intimate contact of liquids with vapors such as packing, baffles, bubble trays, perforated pans, or the like. An absorption medium, recycled from a source to be discussed later, of the desired molecular weight which is usually lower than the highest molecular weight constituents of the wet gas is introduced into absorber 2 through line 3. The wet gas and absorption medium come into intimate contact in the absorber 2 and the desired constituents are absorbed in the absorption medium. The residue or dry gas is vented through line 4 and disposed of in a manner not shown. The fat absorption oil is withdrawn through line 5 and passed through heat exchanger 6 into the upper portion of rectifier 7. If desired, the fat absorption oil may be restripped of the most volatile absorbed constituents by conventional means not shown prior to being introduced into the rectifier 7.

Rectifier 7 is divided into two sections by plate 8: an upper rectification section and a lower redistillation section. Both sections are provided with liquid vapor contact means such as bubble trays, baffles, packing, etc. Plate 8 is so constructed that it allows free upward passage of vapors and a major portion of the reflux to go down. The remaining portion of the reflux is withdrawn as absorption medium through line 9 and is passed through heat exchanger 6, cooler 10, and line 3 into the top of absorber 2. Heat is supplied to rectification column 7 by means of reboiler 11 located adjacent to the bottom of a redistillation section of the rectifier. Sufficient heat is supplied by means of the reboiler to vaporize the absorption oil. This leaves behind the high molecular contaminants in the form of a liquid residue, which may be disposed of through line 12. Vapors of absorption oil ascending from the reboiler supply sufficient heat to the incoming fat absorption oil to liberate the desired absorbed constituents, which pass out through line 13 and condenser 14. A portion of the resulting condensate is returned to the rectifier 7 through line 15 as reflux. The remainder of the recovered product is passed through line 16 to storage.

It is thus seen that the heat supplied by the reboiler not only strips the fat absorption oil of the desired constituents, but separates the absorption medium from the high molecular weight contaminants. Lean oil, line 9, is provided with draw-off means 17 to dispose of additional absorption oil introduced into the system from components of the same in the wet gas.

Many modifications of the instant invention will be obvious to those skilled in the art, for example by rearrangement of pumps, condensers, types of absorbers, rectification columns, reboilers, and other heating means. Automatic control equipment not shown may be used to obtain efficient operating conditions. Such equipment would consist of temperature, liquid level, pressure, and flow controllers.

I claim as my invention:

1. In a process for stripping wet gas containing liquefiable compounds by contacting it in an absorption zone with a lean absorption medium of predetermined molecular weight, said liquefiable compounds comprising components having boiling temperatures higher and lower than the boiling range of said absorption medium, the steps comprising withdrawing from said absorption zone the resulting fat absorption medium containing liquefiable absorbed compounds, subjecting said medium to fractionation in a primary fractionating zone to form vapors consisting essentially of compounds having boiling temperatures lower than that of said lean absorption medium, and a bottom product consisting essentially of lean absorption medium and higher-boiling components, withdrawing a major portion of said bottoms from the primary fractionation zone, heating said withdrawn portion in a secondary fractionating zone to vaporize lean absorption medium and separating it from higher-boiling components, returning resulting vapors to the primary fractionating zone to supply all the heat required for effecting said fractionation, separately withdrawing from said primary fractionation zone the remaining minor portion of said bottoms and returning same to the absorption zone as lean absorption medium.

2. The process of claim 1 in which the ratio of bottom product fed to the secondary fractionating zone to the amount of bottom product recycled as lean absorption medium is at least 2:1, 3. An improved absorption process in which a fat absorption medium is freed of liquefiable components of lower and higher boiling points than the lean absorption medium by the steps comprising stripping said fat absorption medium of low-boiling liquefiable components in a primary fractionating zone with heat supplied solely by oil vapors free from steam from a secondary fractionating zone to form a bottom product consisting essentially of lean absorption medium and absorbed higher-boiling components, withdrawing a major portion of said bottoms from the primary fractionating zone, heating said withdrawn portion in said secondary fractionating zone to vaporize lean absorption medium and separate it from absorbed higher-boiling components, returning the resulting vapors to the primary fractionating zone to effect said stripping, and withdrawing a minor portion of bottoms from the primary fractionation zone to be utilized as lean absorption medium.

4. A vapor recovery process comprising subjecting a vapor-laden gas to intimate contact with a lean absorption medium, said gas having liquefiable components of lower and higher boiling points than the absorption medium, heating the resulting fat absorption oil in a primary fractionating zone with heat supplied solely by oil vapors free from steam from a secondary fractionating zone to vaporize and separate absorbed components of lower boiling temperatures than the absorption medium, and to form a bottom product containing absorption medium together with high-boiling absorbed components, continuously withdrawing a major portion of said bottoms from the primary fractionating zone, heating said withdrawn portion in said secondary fractionating zone to vaporize lean absorption medium and separate it from absorbed higher-boiling components, returning the resulting vapors to the primary fractionating zone, continuously withdrawing a minor portion of bottoms from the primary fractionating zone and returning the same to the absorption system as lean absorption medium.

5. In a process for stripping wet gas containing liquefiable compounds by contacting it in an absorption zone with a lean absorption medium of predetermined molecular weight, said liquefiable compounds comprising components having boiling temperatures higher and lower than the boiling range of said absorption medium, the steps comprising withdrawing from said absorption zone the resulting fat absorption medium containing liquefiable absorbed compounds, subjecting said medium to fractionation in a primary fractionating zone to form vapors consisting essentially of compounds having boiling temperatures lower than that of said lean absorption medium, and a bottom product consisting essentially of lean absorption medium and higher-boiling components, withdrawing about three-fifths of said bottoms from the primary fractionation zone, heating said withdrawn portion in a secondary fractionating zone to vaporize lean absorption medium and separating it from higher-boiling components, returning resulting vapors to the primary fractionating zone to supply all the heat required for effecting said fractionation, separately withdrawing from said fractionation zone the remaining two-fifths of said bottoms and returning same to the absorption zone as lean absorption medium.

RUSSELL N. SHIRAS.